(12) United States Patent
Siracusano, Jr.

(10) Patent No.: US 8,887,050 B1
(45) Date of Patent: Nov. 11, 2014

(54) VIDEO MAPPING, STORAGE, AND RETRIEVAL SYSTEM AND METHOD

(75) Inventor: Louis H. Siracusano, Jr., Montvale, NJ (US)

(73) Assignee: LHS Productions, Northvale, NJ (US)

( * ) Notice: Subject to any disclaimer, the term of this patent is extended or adjusted under 35 U.S.C. 154(b) by 527 days.

(21) Appl. No.: 12/931,213

(22) Filed: Jan. 27, 2011

Related U.S. Application Data

(63) Continuation-in-part of application No. 12/590,941, filed on Nov. 17, 2009.

(60) Provisional application No. 61/462,005, filed on Jan. 27, 2011.

(51) Int. Cl.
  *G01C 11/02* (2006.01)
  *H04N 7/18* (2006.01)

(52) U.S. Cl.
  USPC .......... 715/723; 715/716; 715/719; 715/720; 715/721; 715/722; 715/756

(58) Field of Classification Search
  CPC .... B64C 39/024; B64C 19/00; B64C 39/028; B64C 2201/00; B64C 2201/021; B64C 2201/141; B64C 2201/146; B64C 2201/123–2201/127; G06F 3/005; G06F 17/3087
  See application file for complete search history.

(56) References Cited

U.S. PATENT DOCUMENTS

| | | | |
|---|---|---|---|
| 7,437,225 B1 * | 10/2008 | Rathinam | 701/14 |
| 2004/0233983 A1 * | 11/2004 | Crawford et al. | 375/240.01 |
| 2005/0289482 A1 * | 12/2005 | Anthony et al. | 715/851 |
| 2008/0044155 A1 * | 2/2008 | Kuspa | 386/52 |
| 2009/0327856 A1 * | 12/2009 | Mouilleseaux et al. | 715/230 |
| 2010/0250115 A1 * | 9/2010 | Ohata et al. | 701/201 |
| 2010/0286859 A1 * | 11/2010 | Feigh et al. | 701/25 |
| 2011/0090399 A1 * | 4/2011 | Whitaker et al. | 348/500 |

* cited by examiner

*Primary Examiner* — Amy Ng
*Assistant Examiner* — Claudia Dragoescu
(74) *Attorney, Agent, or Firm* — Gregor N. Neff

(57) ABSTRACT

The positions of target and a video surveillance sensor are plotted on a computer map display. An icon representing the target and its movement with time is shown on the map, as is the movement of the sensor. The mapping facility preferably is used together with a logger for applying electronic tags and displaying live feeds and stored images of the target, and a timeline device for quickly locating stored images having desired attributes.

15 Claims, 11 Drawing Sheets

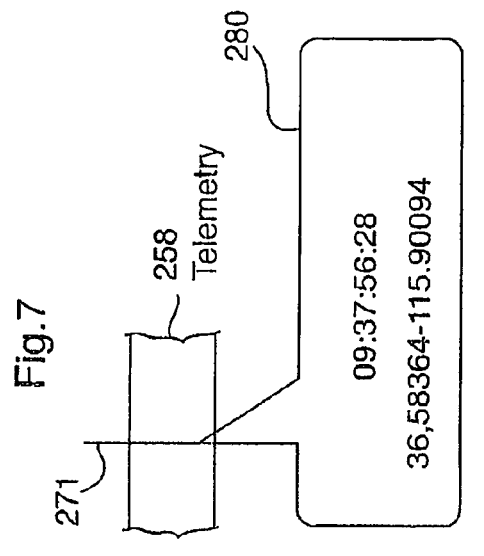
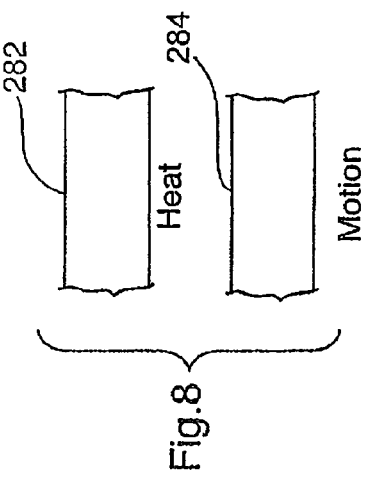
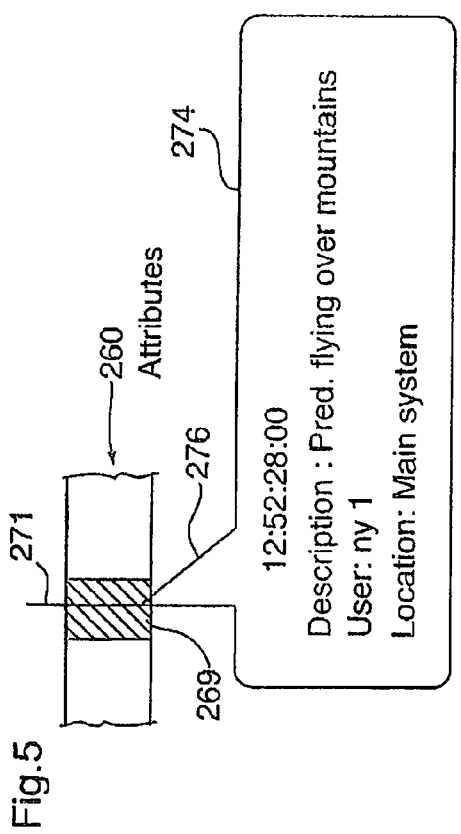
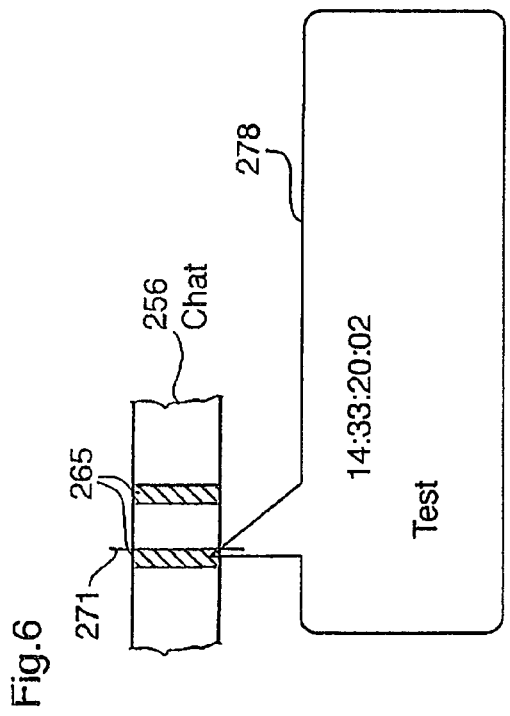

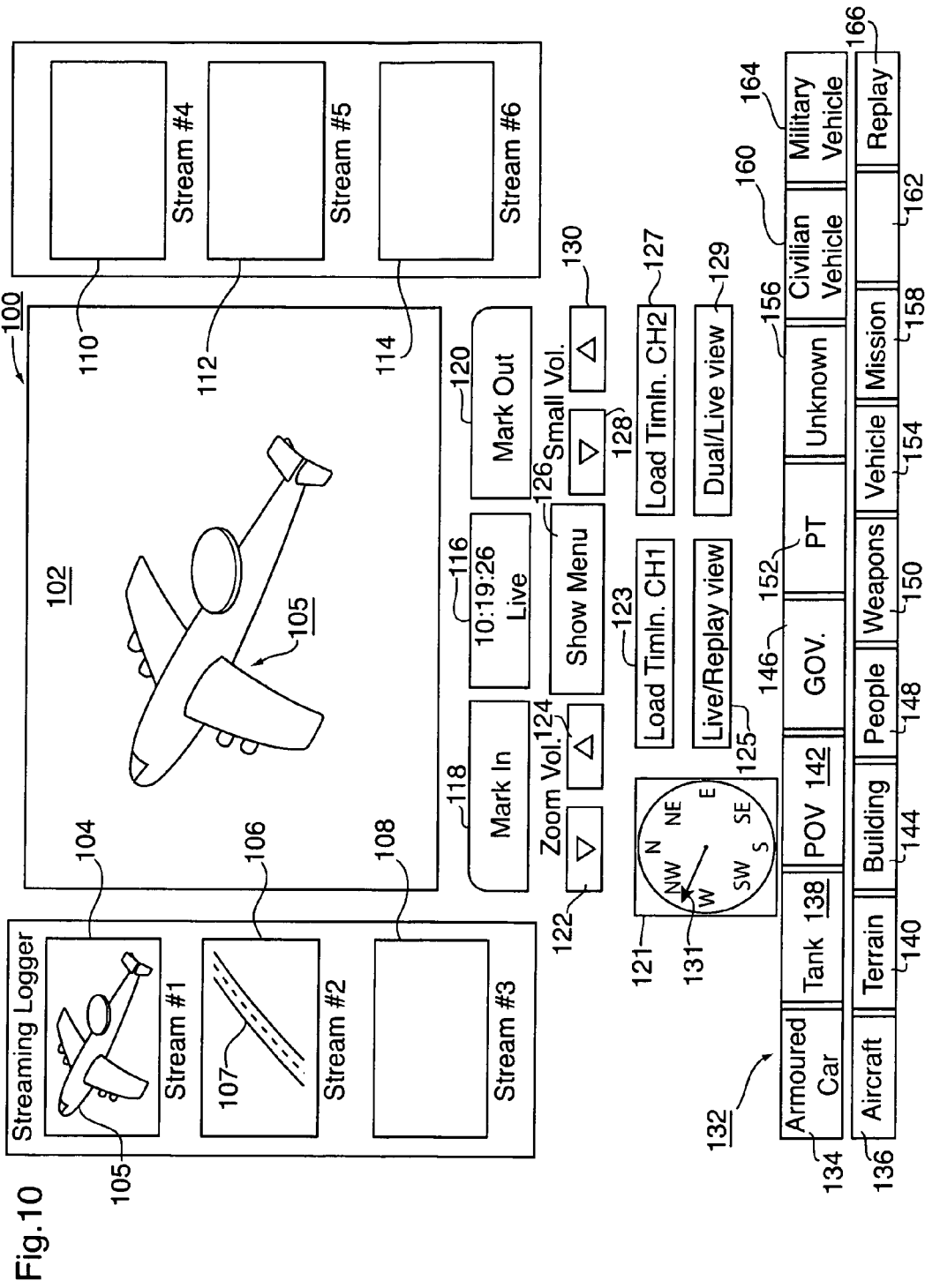

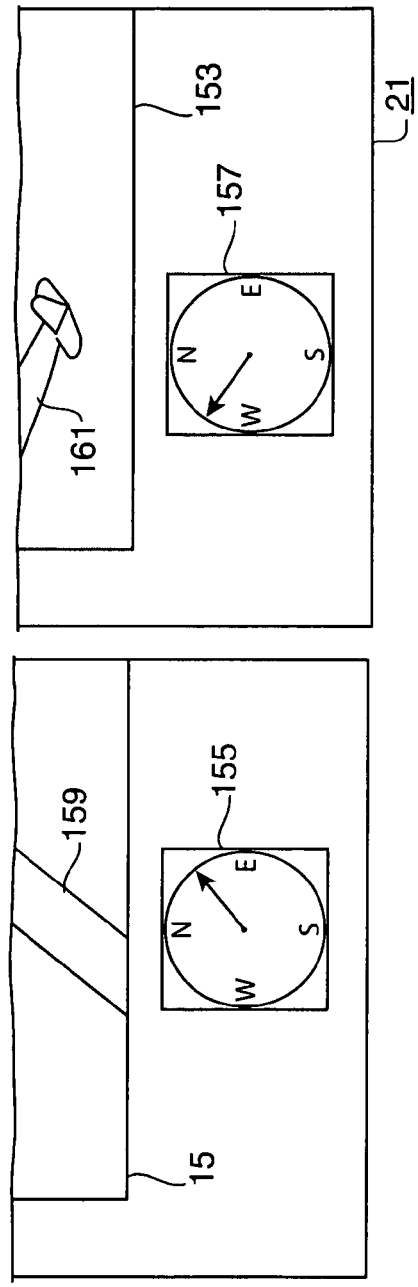
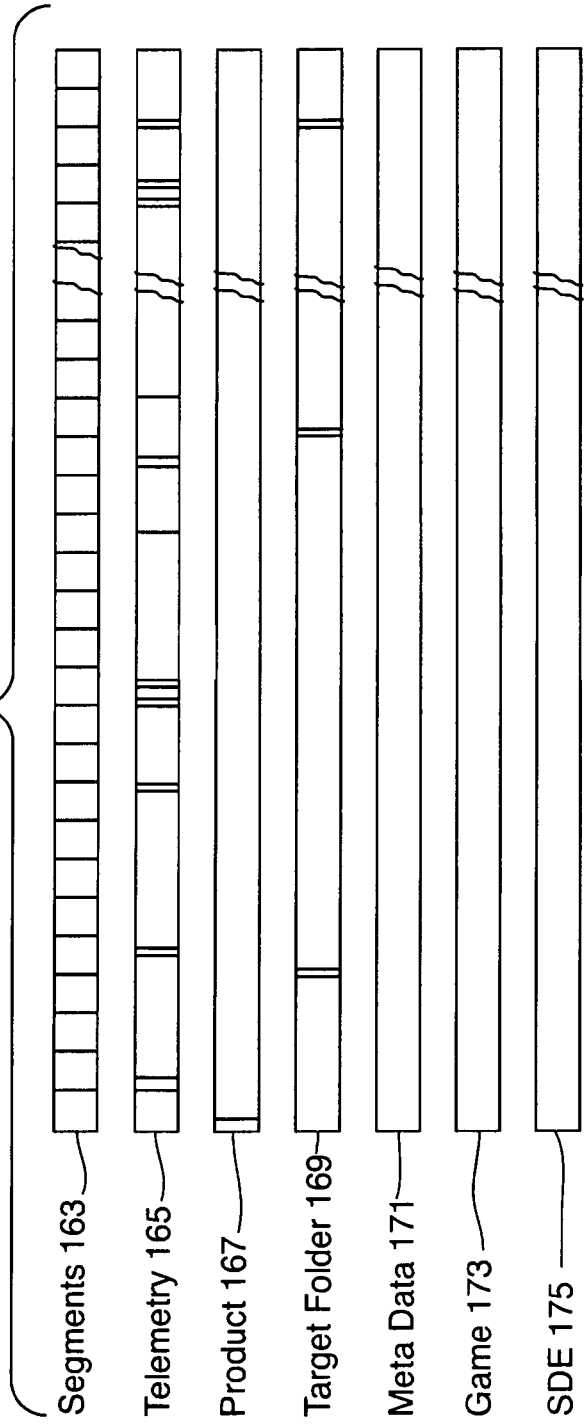

VIDEO MAPPING, STORAGE, AND RETRIEVAL SYSTEM AND METHOD

This patent application is a continuation-in-part of U.S. patent application Ser. No. 12/590,941 filed Nov. 17, 2009, and claims priority from provisional patent application Ser. No. 61/462,005, filed Jan. 27, 2011. The disclosures of both of said applications are hereby incorporated herein by reference.

This invention relates to video surveillance storage and retrieval systems and methods.

The storage and retrieval of video images and audio files, still images and other digital files and related data presents long-standing and difficult problems, especially where the video records are of relatively long duration.

Video loggers have been provided for recording all video program materials broadcast by a given broadcast source. Such logging is done for compliance with laws, and for protection against unjustified claims made against the broadcast source, and for other valid purposes.

In some loggers, operators have applied metadata tags to the records to facilitate later location and retrieval of specific items or segments of the video record. Nonetheless, the labor and time required to retrieve specific images or segments of the recorded programs often is significant.

Some equipment sold in the past by VideoBank Inc. of Northvale, N.J., USA, the assignee of this patent application, has provided improved ability to retrieve selected video images, such as by identifying specific locations of video images having predetermined attributes, applying metadata tags to those images, and using the tags to retrieve them. Although that equipment represents a substantial step forward, further improvements are needed.

In accordance with the foregoing, it is an object of the invention to provide a video surveillance storage and retrieval system and method which enables video images to be selected and retrieved more quickly and easily than in the past, and which permits selection on the basis of a wider variety of criteria than in the past.

Another problem with video surveillance, and particularly video surveillance from aircraft or moving land vehicles, is the accurate location of a particular moving subject, which will be referred to as a "target."

Using prior equipment, the location of the target at a given point in time can be determined by use of available data, but the development of the information as to the target location and the transmission of it to other personnel for utilization often is unacceptably slow.

Accordingly, another object of the invention is to provide video surveillance, storage and retrieval equipment and methods which make it very much less time consuming to locate a target and make the location information available relatively quickly so as to enhance the usefulness of the information.

A further object of the invention is to provide a system and method for relatively quickly and easily locating the video surveillance device or camera relative to the target so as to provide valuable information and guidance of this surveillance operation.

In accordance with the present invention the foregoing objectives are met by the provision of a video image storage and retrieval system including a video logger having electronic means for electronic tagging of video images to locate by time code image features of interest, timeline display means for displaying a timeline with markings indicating the time boundaries of predetermined segments of a series of video images, and a retrieval means with a marker or cursor for alignment with the timeline and for displaying video images selected with the aid of another timeline from a segment at the location of the marker.

The invention also provides means for storing and subsequently locating and retrieving, by means of a timeline, chat stored with the video images, and to produce new video clips and images.

A further feature of the invention is the provision of multiple timelines on a single display with multiple video image streams being displayed adjacent one another.

A further feature of the invention is the provision of the means for recording, tagging and subsequent retrieval of image locations where motion and/or telemetry and/or heat is detected, thereby facilitating surveillance.

A further "filter" feature allows the location of specific types of events not previously segregated from the others.

In a further aspect, the invention comprises the provision of computer displays of timelines for video sequences, in which a first timeline shows time divisions for segments of the longer sequences, and the other timelines each provide for locating images within the segments. Timecodes in the other timeline(s) are aligned with those in the first timeline so that searching for images in the other timeline(s) is facilitated.

In accordance with another feature of the invention, a map display device is provided, either as a stand-alone unit, or together with other equipment described above which displays a map of an area in which target is located, and provides indicia on a map of that area which locates the target in the area at each of a series of time intervals and represents the path of a moving target on said map replica.

Preferably, indicia also are positioned on the map display to indicate the location at given successive points in time of the surveillance device, such as an airborne camera or vehicle-borne camera. The path of the surveillance device also is indicated on the map display.

Telemetry information is available for all map locations.

The map display equipment is used to great advantage with logger and time line equipment described above in order to provide information regarding various attributes of the targets and in order to enable facile manipulation of the images to give maximum location and identification information in the smallest amount of time.

Preferably, the logger is provided with a display device for displaying video images from a live video feed and simultaneously displaying prior images from the same feed in close proximity to the live images.

The live video images are compared with the prior images and the change in the subject matter can be detected quickly and easily.

The foregoing and other objects and advantages of the invention will be set forth in or apparent from the following drawings and description.

In the Drawings:

FIGS. 5, 6 and 7 are samples of data displays produced for various images selected and reproduced on the display screen of FIG. 4;

FIG. 8 is a schematic diagram showing additional timelines which can be displayed on the screen of FIG. 4;

FIG. 10 is a schematic representation of a modified display screen showing a further feature of the invention;

FIG. 11 is a partially broken away view of a modification of the display screen shown in FIG. 10;

FIG. 12 is a schematic diagram of an array of time lines illustrating another feature of the invention;

OVERALL SYSTEM

Figure 1:
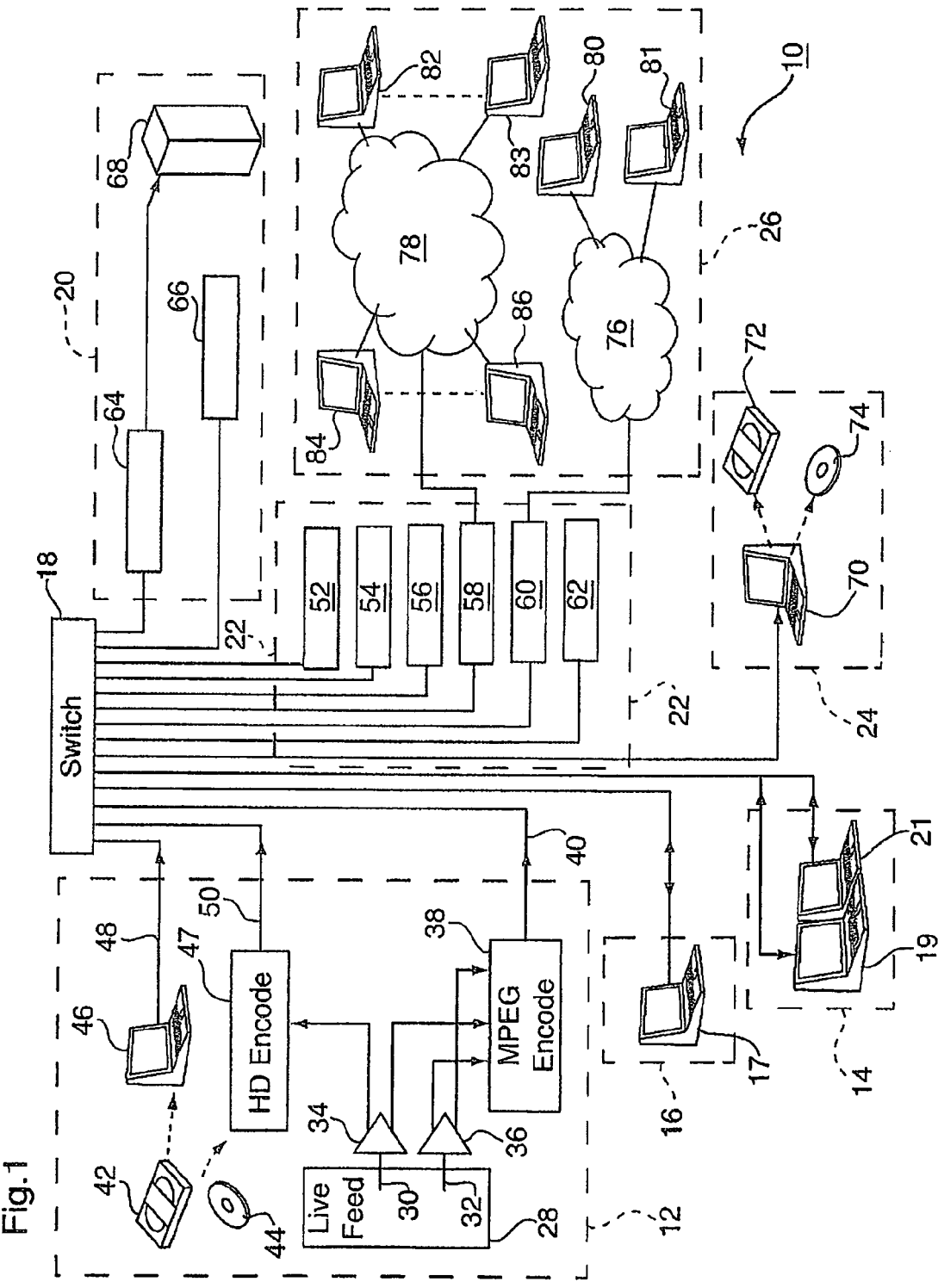
FIG. 1 is a schematic diagram of a system comprising and utilizing the invention.

FIG. 1 is a schematic diagram showing the storage and retrieval system 10 of the present invention.

System 10 includes an encoding section 12, a logger section 14, an administrative control section 16, a local area network switch 18, a storage and control section 20, a server section 22, a production section 24, and a web access section 26.

In general operation, the system 10 receives video signals from live feeds or archival storage media such as videotapes or discs. Those signals are encoded and stored in one of a number of servers in the server section 22. The signals are tagged by use of logger equipment including a workstation 21. The signals are retrieved and displayed, together with timelines, at any of several workstations in the system. Selected images are used live, or after storage or reproduced on DVDs or other media with the use of a workstation 70 in the production unit 24. Alternatively, or in addition, personnel located at remote locations can use all or part of the system under license through an internet connection, as indicated in the web access section 26.

Encoding

Multiple live video feeds are delivered from a source 28. For example, six or more live feeds can be accommodated. Two such live feeds 30 and 32 are shown in the drawing.

Each live feed is delivered to an output amplifier 34 or 36 which divides the signals so as to supply them on two output lines leading to an MPEG encoding unit 38, and/or to a HD encoding unit 47, and ensures the timecodes of the signals are in sync. The unit 38 contains two encoder cards for each live feed. One card is a MPEG 1 encoder, and the other is a MPEG 2 encoder. Thus, both MPEG 1 and MPEG 2 encoding, or MPEG 1 and HD encoding are provided for each live feed.

The encoded output signals from the unit 38 are delivered through the switch 18 to a server 62 where they are stored.

Archival video records, such as those stored on DVDs 42 or CDs 44 are encoded in workstation 46 or by an HD encoder 47. As noted above, live HD video also is encoded by encoder 47. Encoded signals are sent over lines 48 or 50 through the switch 18 to the server 62.

Data associated with the video signals is stored in a data core server 54. Storage is controlled by Microsoft SQL or Oracle software for database management.

Advantageously, the MPEG 1 encoded signals are used in the workstations and elsewhere to manipulate the signals, but the corresponding MPEG 2 or HD signals are used in producing the end product. Thus, in manipulating the signals, the speed and the cost of the equipment are optimized, whereas the signals finally recorded have the highest quality.

Administrative Control

The administrative control workstation 17 is programmed to apply a unique identifier code to each separate unit of live video or archival video received. For example, each such unit typically will be identified with a recording number, a recording date, and other information unique to that unit.

In addition, the workstation 17 is adapted to do the following:

a. Create new user groups and configure multiple workflows using the network 10.

b. Customize metadata categories and descriptors.

c. Set permissions (passwords, etc.) for individual users and groups to use the system.

d. Reconfigure system preferences.

e. Schedule automated encoding, transcoding and distribution of stored images and data.

f. Generate system reports.

Optionally, the workstation 17 can be used to display and select video images using the timelines to be discussed below, thus operating to select and retrieve video images which are to be retrieved.

Storage Control

The storage control portion 20 of the network 10 includes a hierarchical storage manager unit 64, which selectively delivers older data and video to a tape library 68 for long-term limited-access storage. The older signals and information are downloaded periodically, when necessary.

If desired, long term storage can be provided on other server devices not shown. For example, Blu-ray DVDs or other devices which may exist or be developed in the future can be used for long-term signal storage.

An optional storage control unit 66 is provided for use in storing information in other servers not shown in FIG. 1, if desired or needed.

Storage

Some of the servers in the server unit 22 already have been described, at least in part.

Server 52 is a migration management server which is programmed to manage the movement of files in the system.

Server 58 is an application server for facilitating web communications with an interne power user group, represented by the cloud 78 and workstations 82, 83, 84 and 86. These workstations enable the storage and retrieval system functions remotely through the world-wide web. These users typically are given a license to do so.

Another server 60 is an application server to enable web communication with another group network indicated at 76 and including multiple workstations such as the stations 81 and 82.

Some of the latter workstations are given a license only to view the feeds provided by the system. Other workstations are enabled to manipulate the images and data to a certain extent but do not have the full control of the power users group.

Production

The production section of the network 10 includes a workstation 70 and exemplary DVD 72 and CD 74 which are symbolic of the record media that the selected video signals are recorded on for transportation and use elsewhere. The workstation 70 controls the preparation of the output media, and performs other functions such as playlist production, etc.

If desired, the timelines for the video can be displayed at the workstation 70 instead of, or in addition to the workstation 19 in order to use the beneficial timeline and other selection features of the invention.

Logger

The logger 21 is in communication with the core server unit 54 which stores the data (timecodes, metadata, etc.) for the incoming video.

The detailed functions of the logger 21 will be explained below. However, in general, the logger 21 is used to display the streams of video being received and apply metatags and attributes and store the data so developed in the core server 54.

The logger 21 receives an encoded video signal so as to enable the unit to display the live video coming in to the system for use in metatagging and other functions.

Figure 2:
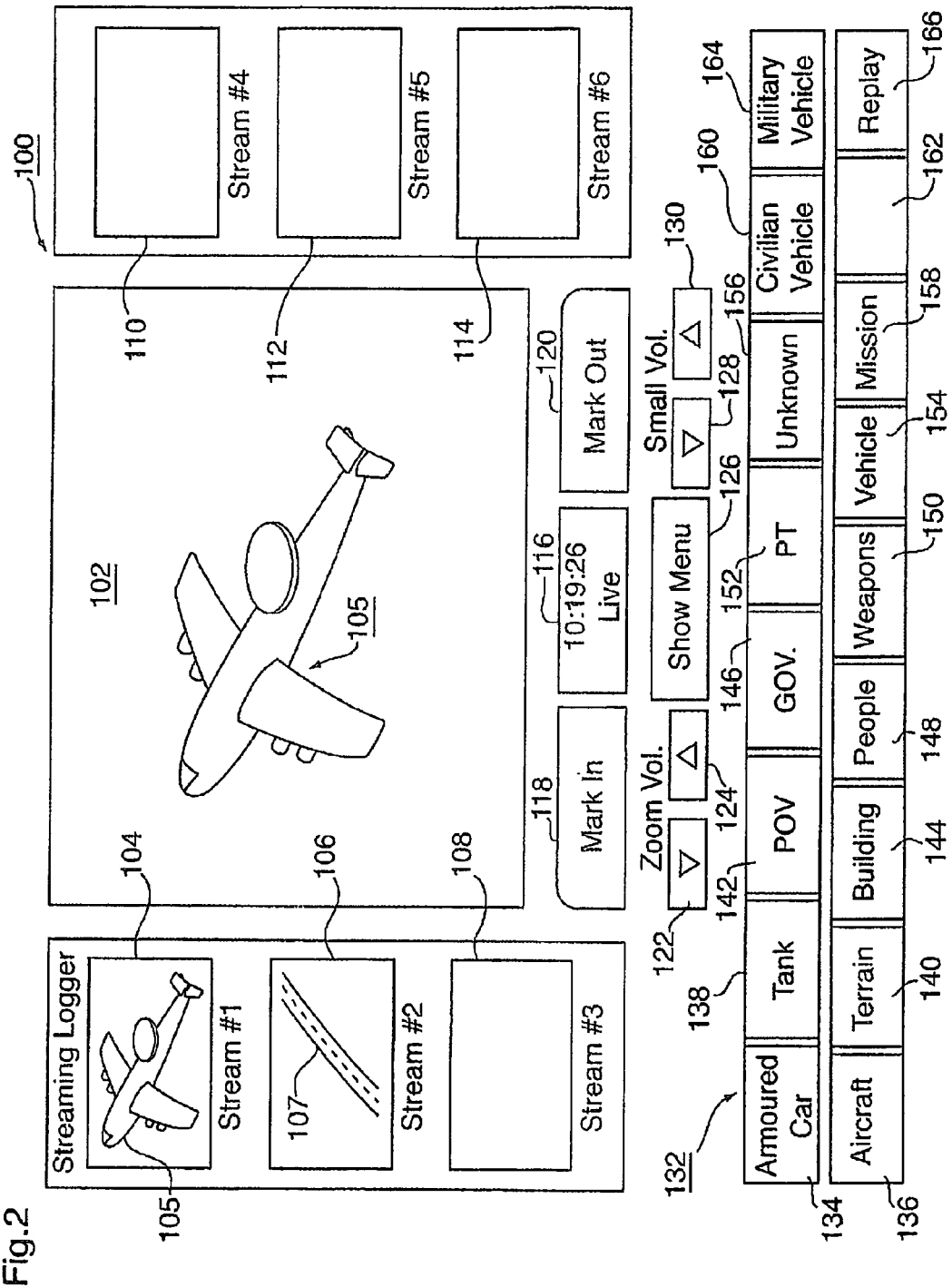
FIGS. 2 and 3 are schematic representations of typical display screens used in the logger unit of the present invention.

FIG. 2 is a partially schematic view showing a typical screen display 100 for the logger. The screen display preferably is a touch-screen with a centrally located large picture display area 102, and six smaller video displays for displaying up to six different streams of video signals. These displays are numbered 104, 106, 108, 110, 112 and 114. Images are shown in only two of the displays, numbers 104 and 106. In this case, screen 104 displays an image 105 of a military aircraft, and screen 106 displays a road 107 in a ground area under surveillance. Preferably, the large central display area 102, displays an enlargement of the same image 105 as in one of the six video streams.

A time display 116 displays the time code at that instant, and of course, is constantly changing while video streams are being received. Control push buttons (actually, touchpads) 118 and 120 are provided for tagging images of interest which are being displayed on the large center screen 102. Button 118 can be used to mark the start of a desired sequence, and the pad button 120 is used to mark the end of the sequence.

The "LIVE" indication on push button area 116 indicates that the sources for the various streams being viewed are live, as opposed to recorded.

Various other controls, such as a zoom volume control 122 and a sound volume control 124 for the large center screen 102 are provided, and a zoom control 128 and volume control 130 are provided for the smaller images. A "SHOW MENU" button 126 can be used to display on the screen 102 a menu of the available stream display screens.

A customized, virtual keypad 132 is provided at the bottom margins of the screen area shown in FIG. 2. The virtual keys in the keypad 132 are designed by the operator of the system according to one of several available profiles to indicate specific attributes to be looked for in the video streams, and then to use those keys to form metadata tags. Those tags can be used in searching for corresponding images. For example, virtual key 134 is labeled "ARMORED CAR." Similarly, pad 138 is labeled "TANK." These terms are used to identify war vehicles. Other keys like 160 and 164 are used to indicate civilian vehicles and military vehicles, respectively.

In the bottom row, key 136 is used to identify "AIRCRAFT"; key 140 indicates "TERRAIN"; key 144 indicates "BUILDING" etc. Keys 142, 146, 152 and 156 indicate, respectively, "POV"; "GOV"; "PT" and "UNKNOWN." Similarly, keys 148, 150, 154 and 158 indicate "PEOPLE"; "WEAPONS"; "VEHICLES" and "MISSION," respectively. Keys 162 is blank but can be used to indicate another attribute of the video streams to be searched for. Key 166 is used to effect a replay of video signals previously played.

The replay key can be used to replay images and apply tags to images in which the application of metatags was missed.

In accordance with one advantageous feature of the invention, the server 62 which receives the encoded video signals is programmed to develop a timeline marking signal automatically and store it whenever a predetermined time elapses from the previous such mark. These timeline signals are stored in the memory 56 for later use in a manner to be described below. For example, the signal can be developed once every ten minutes, or once every hour, or at other time intervals, as desired. As it will be explained below, these uniform time signals are used in a manner so as to divide a lengthy recording into much shorter time segments, preferably uniform in time duration, so as to facilitate searching for the video signals desired.

Figure 3:
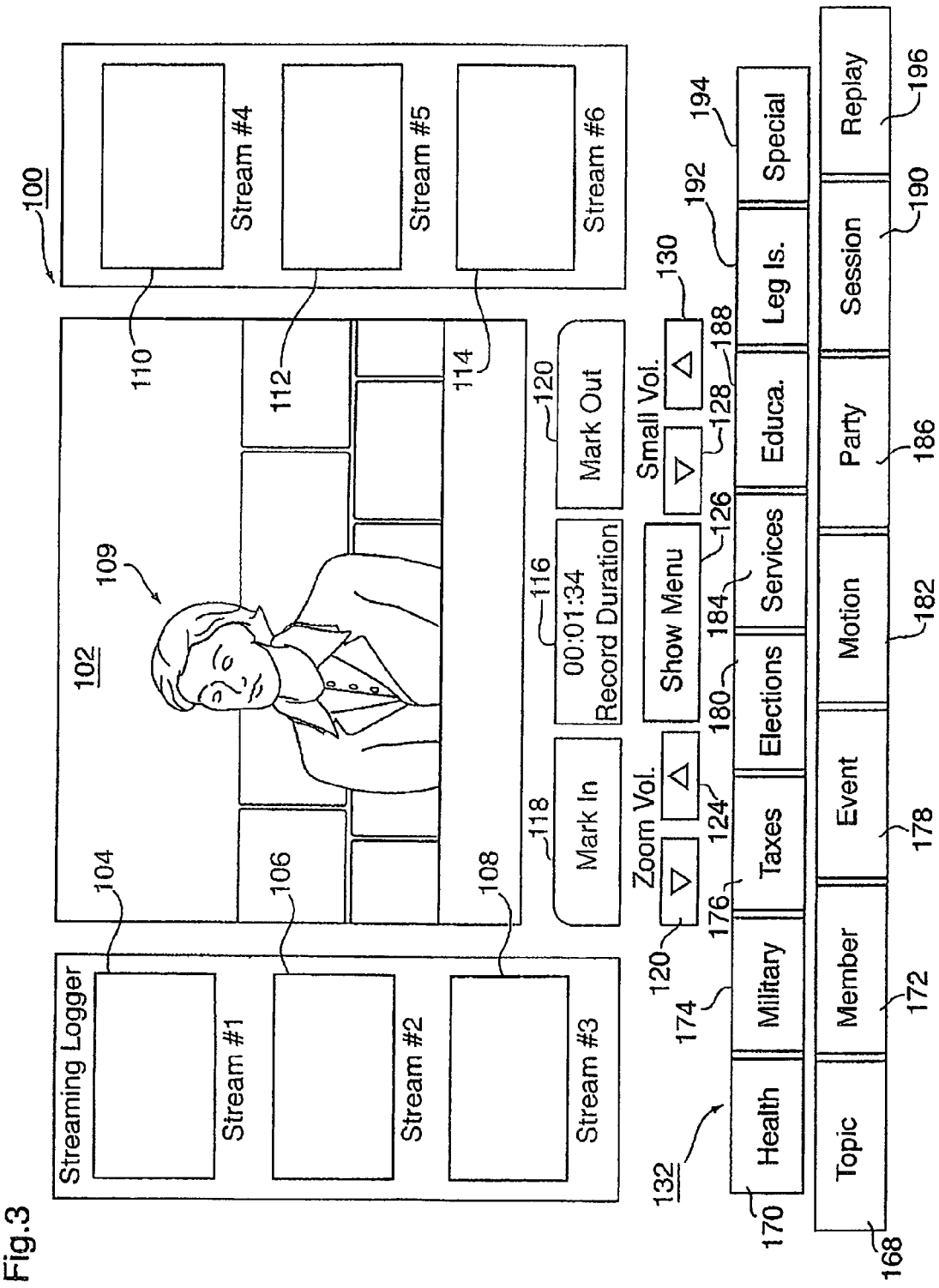

FIG. 3 is a view of the screen 100 shown in FIG. 2 except adapted to review and analyze video images in a different category or "profile." The logger can be programmed to perform the logging functions with respect to video images of virtually any desired topic, such as baseball, football, military operations, automobile racing, etc.

The particular topic illustrated in the screen 102 indicates schematically a person 109 speaking at a legislative hearing, and therefore, the subject matter of the keys of the keypad 132 are directed towards that subject. In this case, the virtual keypad is quite different from that shown in FIG. 2 and is programmed to provide indicators of topics under discussion, such as "HEALTH," "MILITARY," (buttons 170, 174); "TAXES" (176), "ELECTIONS" (180), "SERVICES" (184), "EDUCATION" (188), "LEGISLATION" (192) and "SPECIAL" (194).

Similarly, the keys in the bottom row indicate "TOPIC" (168); "MEMBER" (172); "EVENT" (178); "MOTION" (182); "PARTY" (186); "SESSION" (190) and "REPLAY" (196). It should be understood that the picture appearing on the screen 102 will be the duplicate of one appearing in one of the smaller screen areas 104, 106, etc. None of the smaller images has been shown, in order to simplify the drawing.

The timecode is displayed at 116. In this case, however, the pad 116 is labeled "RECORD DURATION" because the video images are coming from a unit in the storage section 20 and are not live feeds.

Timeline Display

Figure 4:
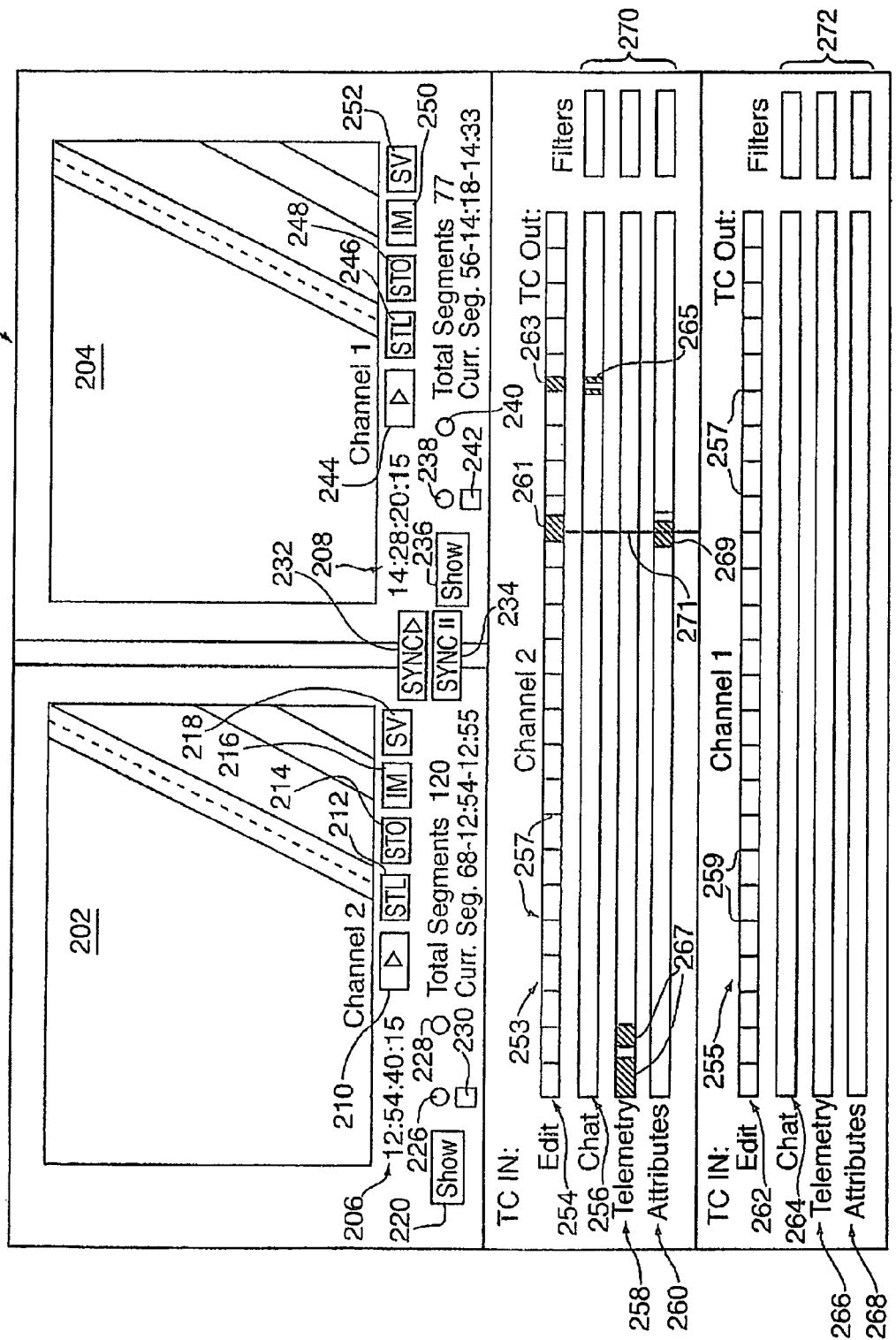
FIG. 4 shows a typical display of the timelines used to facilitate location and retrieval of specific images or image sequences from video signals.

FIG. 4 is a schematic diagram showing the display 200 of timelines used in accordance with the present invention to facilitate the rapid identification, location and retrieval of selected video record segments. Video images are displayed on two different side-by-side screens 202 and 204. Although the display screen can be a touch-screen, a hand-controlled cursor preferably is used, for purposes to be described below.

The screen 202 is labeled "CHANNEL 2" and the screen 204 "CHANNEL 1."

Two sets of timelines 253 and 255 are displayed below the screens 202 and 204. Timelines 253 correspond to images in channel 2 (screen 202), and timelines 255 correspond to those in channel 1 (screen 204).

The current timecode for channel 2 is displayed at 206, and the current timecode for channel 1 is displayed at 208.

The buttons 210 and 244 can be used to fast forward the video images. Buttons 212 and 246 can be used to start the video running at normal speed and buttons 214 and 248 can be used to stop the video.

The buttons 216 and 250 are "IMAGE" buttons which capture still images.

The buttons 218 and 252 are "SAVE" buttons which are used to store a selected segment of the video streams being viewed. Items 226, 228, 230, 236, 238, 240 and 242 are indicator lights to indicate various special functions in operation.

Lights 228 and 240 indicate that the zoom function is enabled. Lights 226 and 238 indicate that the images are being displayed in "MISSION MODE"; that is, without use of the zoom function. The zoom function expands the timelines in the segment of the EDIT line selected so as to greatly enlarge the detail of each of the timelines for ease of viewing.

Lights 230 and 242 indicate that an offset is being applied through the timeline for the purpose of matching the timecode used in forming the timelines to the original timecode.

Two synch buttons 232 and 234 are provided. Button 232 is for playing the videos on the two screens together, and button 234 is for causing the videos on the two screens to pause simultaneously.

Timelines

The two timeline groups 253 and 255 each include a top timeline marked "EDIT" 254 or 262; a second timeline 256 or 264 marked "CHAT" a third line 258 or 266 marked "TELEMETRY"; and a fourth line 260 or 268 labeled "ATTRIBUTES."

To the right of each set of timelines is a group 270 or 272 of line segments forming boxes under the heading "FILTERS." Groups 270 and 272 are used with the chat line, the telemetry line and the attributes line to search for images with specific attributes not otherwise provided for. Standard search software and routines are used.

In each of the EDIT lines 254, 262, there is a plurality of vertical lines 257 or 259 which are of uniform spacing, each indicating a time segment of the video record of a predetermined length of time. For example, each segment can be ten minutes long, or an hour long, or essentially any desired subdivision of the total program duration.

In the displays below the push buttons 210, etc. are listed the total number of segments in the timeline for the video appearing on the screen immediately above it. Below that notation is the number of the current segment being displayed on the screen. For example, beneath screen 202, the display states that there are 120 segments in the video being displayed and that the current segment is number 68, which covers the time period from 12:54 to 12:55.

The display under the screen 204 indicates that the edit line 262 has 77 segments. The spacings between the lines 257 and 259 are not necessarily to actual scale; they are simplified for the purpose of ease in illustration.

The EDIT timelines 254 and 262 are used, preferably together with a movable cursor which creates a vertical line 271 which spans all of the timelines. The cursor 271 preferably is operable by means of a mouse, trackball or similar device.

Preferably, each of the timelines uses multiple colors to indicate timeline marks 257 or 259, and special areas of interest such as 261 and 267 in the attributes line, which indicate the location of the cursor.

The EDIT timeline 254 or 262 can be used to advantage to quickly narrow the search for a segment known to have occurred during a particular time span. The cursor is moved to this time span in question by positioning it on the EDIT LINE 254, and then searching further by use of the attributes, telemetry, chat, or other timelines which have been displayed.

Readout Windows

FIGS. 5, 6 and 7 show samples of readout windows 274, 278 and 280. Each has a white background and a border and a pointer such as the pointer 276 pointing to the timeline position at which the information in the window is obtained. These boxes are actually displayed on the screen shown in FIG. 4, but are not shown there for the sake of clarity in the drawings.

FIG. 5 shows a window displaying information readout at the position of the cursor 271 in the ATTRIBUTES timeline 260. The window gives the timeline location; the description of the attribute; the user identification and location.

FIG. 6 shows a window 278 for information appearing in the CHAT timeline 256. The window indicates the time at which the chat occurred and the chat text which was recorded.

FIG. 7 shows a similar window 280 for the TELEMETRY timeline 258. The timecode is given, along with numbers indicating the longitude and latitude of the area under video surveillance.

It is within the scope of the invention to supply other timelines representative of other parameters of the video streams being recorded.

FIG. 8 shows a further timeline 282 which would indicate the detection of heat such as when infrared detection is used to "see" hot tank motor engines or other such heat sources at night.

Timeline 284 is one indicating the locations at which motion in a given stream of video images is detected. This is useful, for example, in surveillance of an area to determine when troop movements or vehicle movements occur.

The principles of use of the timelines shown in FIG. 8 as well as those shown in FIG. 4 are the same; that is, a cursor can be used to locate a time segment on the EDIT line to quickly find specific items of interest in the other timelines. This information can be used to create video image sequences or clips which then can be transmitted to the production equipment 24 where it can be transferred to DVD or disc, etc. Of course, if the equipment is used live at a sporting event, the clips or segments can be transmitted to broadcast equipment for selective broadcast to complement the live video being broadcast.

The system and method described above fully meet the objectives set forth above. The invention greatly facilitates the retrieval of video data and images on the basis of subject matter and other desired characteristics. This makes it relatively easy and fast to prepare video sequences of specific subjects located in a vast quantity of video images recorded over a substantial length of time.

Mapping and Other Enhancements

Figure 9:
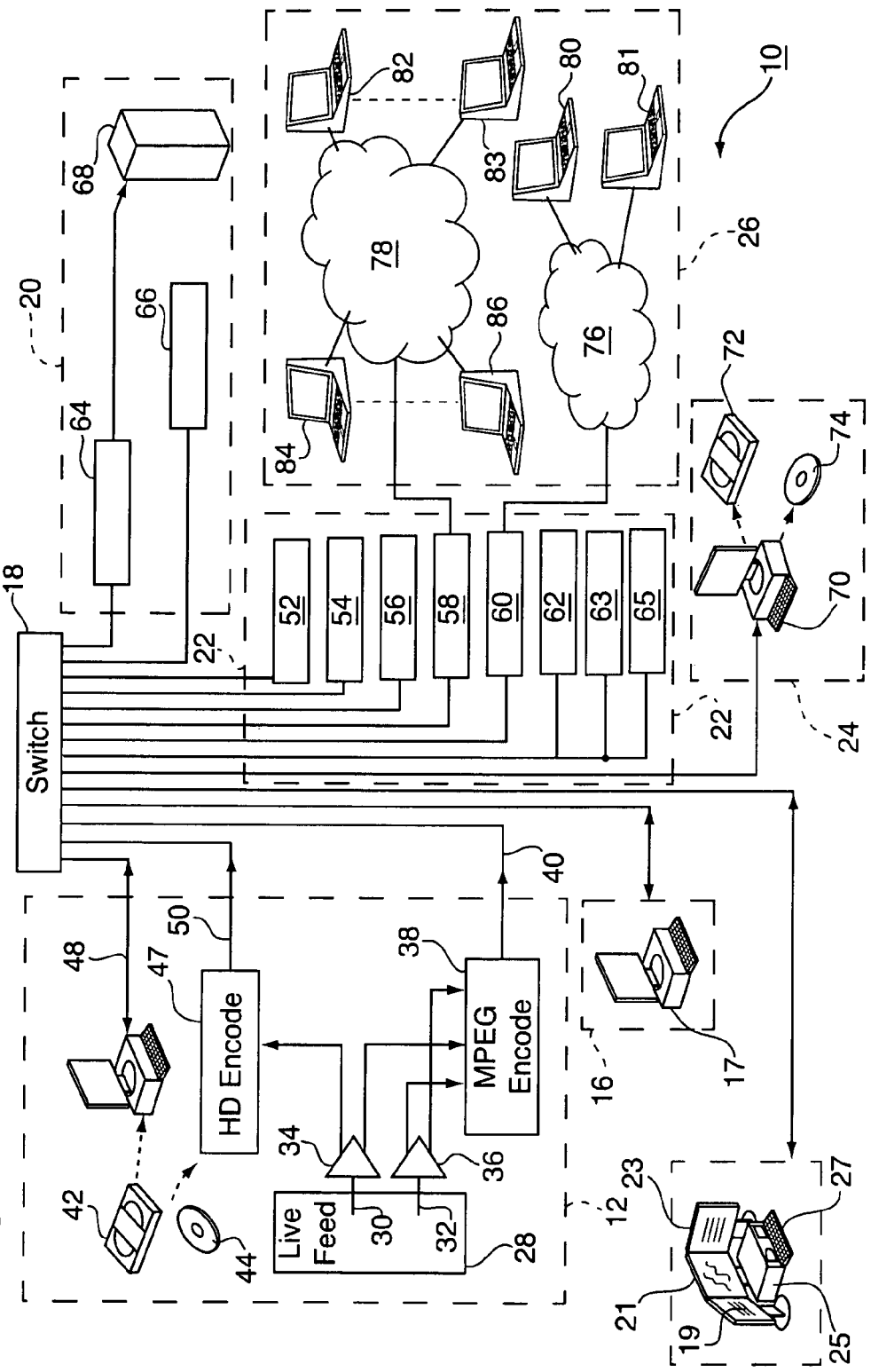
FIG. 9 is a schematic diagram, like that in FIG. 1, of a further embodiment of the invention.

FIG. 9 is a schematic diagram, like that in FIG. 1, showing a modified and improved system in which a mapping capability, as well as other enhancements, has been added to the system shown in FIG. 1.

The system shown in FIG. 9 is essentially the same as that shown in FIG. 1, except that, in addition to the time line display unit 19 and the logger display unit 21, there is a map display unit 23. Advantageously, the three units 19, 21, and 23 preferably are hinged together side-by-side in a three panel array, used with a desk-top unit 25 including a keyboard 27 and mouse (not shown).

In addition, in the server unit 22 are included two additional servers, a map data server 63 and a shared geo-reference or "target" server 65. The map server 63 provides convenient on-site storage for world-wide map data and related software, such as that sold by ESRI, headquartered in Redlands, Calif. Preferably, the software used is sold under the name "ArcGIS Server" and "ArcEditor Software." Such software and data bases are readily available and well-known. Other similar map data and software such as that sold by Google under the name "Google Maps," and other similar software and databases can be used, depending upon the detailed needs of the particular use to which the system is to be put.

The shared geo-reference folder server 65 (also referred to as a target folder server) stores folders, each of which contains data giving information concerning a specific area on the map of the region under surveillance or placed under surveillance.

The logger and time line devices and displays operate substantially as shown and described above, with significant improvements, which will be discussed below.

In general operation, the modified system shown in FIG. 9 operates as before, except that the mapping function can be enabled to map live video feeds, preferably through the logger and time line devices. Alternatively, the mapping function can operate with stored video, to provide maps showing the location of activities under surveillance.

Web-based units 26 are equipped to display web versions of the maps and other information to provide capabilities similar to those single-location systems.

If desired, a mapping function can be used directly upon live video feeds.

Before describing the mapping function, it is preferred to describe some of the logger and time line enhancements, because they directly or indirectly affect the mapping functions to be described below.

Logger Enhancements

Referring now to FIG. 10 of the drawings, the logger display of FIG. 2 has been modified to show some of the enhancements.

Each of the display components operates as described above, with certain exceptions.

One improvement is the addition of a heading dial or compass display 121 with a circular dial marked with the directions of the compass, and an indicator 131 (preferably in a color different from the background) which points to the true heading of a moving object being displayed in any one of the seven displays 102, 104, 106, 108, 110, 112 and 114. This compass display, which is well-known, uses telemetry information to indicate the true heading.

Also provided are four additional touch-screen buttons 123, 125, 127 and 129.

The buttons 123 and 127 can be activated to load information into one of two time lines in the time line device.

Button 129 is a dual/live view button. By touching this button, two live feeds can be viewed side by side simultaneously, as is shown schematically in FIG. 11. FIG. 11 shows a first live picture display 15 showing a road 159, and a second live video display 153 showing an aircraft 161. Each separate display has its own compass 155 or 157, like the compass 121 shown in FIG. 10.

This enhancement permits the simultaneous showing of two videos, perhaps related to one another, so that the operator can observe similarities, differences, and other features giving valuable information.

Button 125 is a live/replay view button. By touching this button, a live feed video picture such as picture 15 in FIG. 11 can be shown simultaneously with another video replay from the same video feed at a previous moment in time. The previous images can be selected by time-code, either with or without the time-line equipment.

This feature can be valuable in that it allows the comparison of the current video feed with a video picture of the same subject at a somewhat earlier time, thus enabling an operator to see at a glance recent changes in the subject matter, which can give valuable information very quickly.

Timelines

FIG. 12 shows timelines including a "segments" line 163 (like the edit line 254 in FIG. 4); a telemetry line 165 (like line 258 in FIG. 4); a "product" line 167 for video clips, etc; "a target folder" line 169, and lines 171, 173 and 175 for ancillary map program features. Other lines such as "attributes" and "chat" are used but not shown in FIG. 12.

Live Map Viewer

The live map viewer screen 23 (FIG. 1) is launched by entering "Live Map Viewer exe" on the desktop unit 25.

The default screen which first appears preferably is a view of part of a world map (not shown).

Assuming that it is desired to use the map viewer with a live feed, the channels of live video feeds available is shown on a channel guide 191 (FIG. 13) immediately appears automatically as an overlay on the screen. The channel guide 191 includes the available channels in the logger, and in this instance, comprises two channels 195 and 197.

Figure 13:
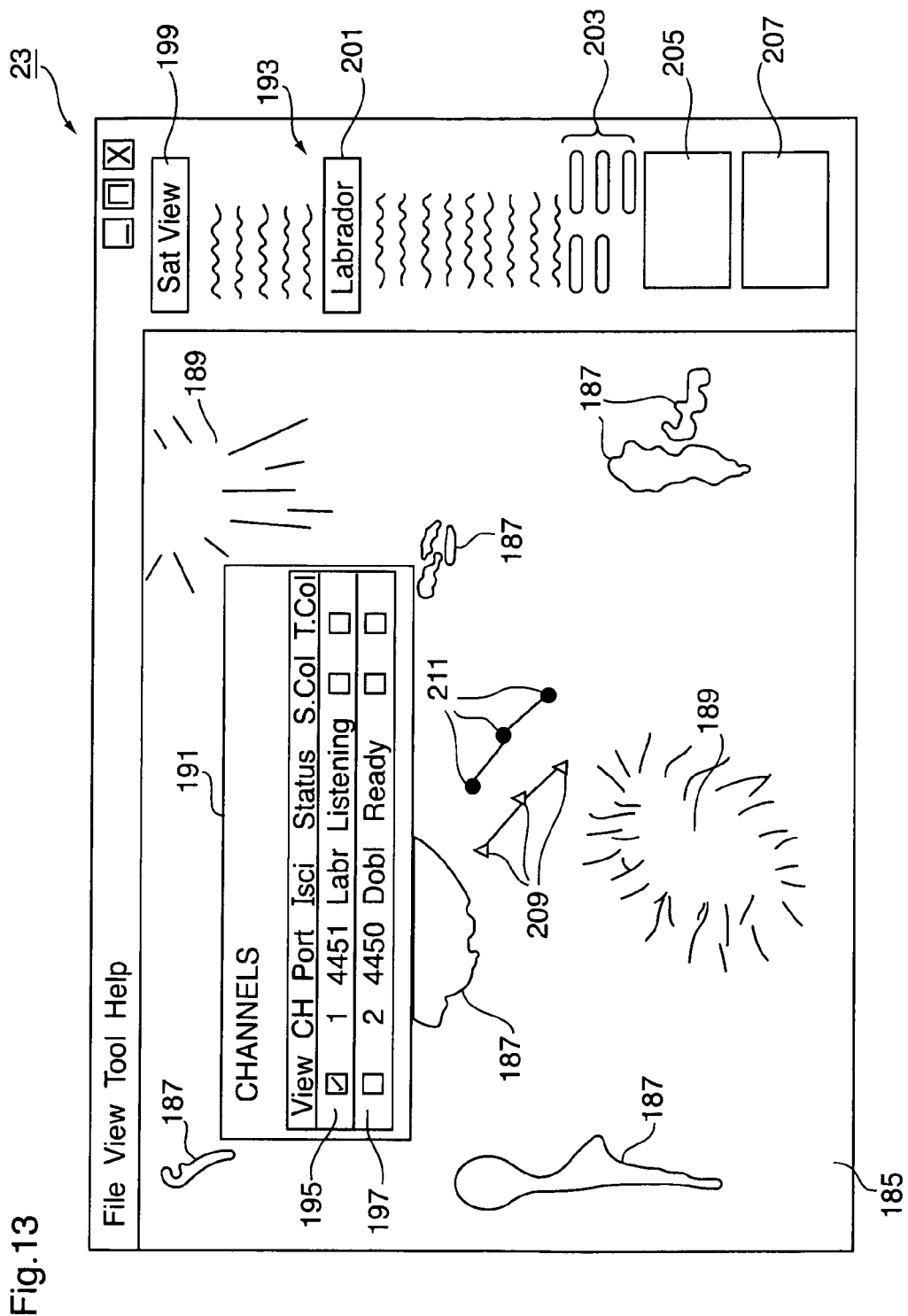
FIG. 13 is a schematic representation of another display illustrating a mapping feature of the present invention.

Still referring to FIG. 13, the operator also can select one of two different views; satellite view 199 or "mission view" 201, which indicates, in this case, a selection of Labrador from the channel guide 91. The views provided under the "satellite view" option are the same as those provided in most mapping software and will not be described here in detail.

The available channels correspond to the channels in the logger.

On the display 185, a channel label will appear (not shown in FIG. 13) along with a triangle, such as one of the triangles 209 and a circle, such as one of the circles 211, shown in FIG. 13. The map display 185 in FIG. 13 shows the map for the area around the locations of the triangle and circles, namely, in this case, in Labrador at telemetry points corresponding to the target, shown by circles, and the sensor, shown by triangles. The sensor, such as a camera, can be a camera in a UAV (unmanned aerial vehicle), or on a mobile land vehicle such as a truck, or it can be stationary. The sensor preferably is controlled remotely by an operator who keeps the sensor aimed at the target.

The map shows the terrain of the area in which the target is located with bare patches 187, hills or mountains 189, and other surface features, illustrated schematically.

Preferably, the map display is programmed so as to show the target at or near the center of the map at substantially all times. This is performed automatically. As a result, the map area shown will shift from time to time automatically to maintain the target near the center of the map.

In accordance with one feature of the invention, the computer program can automatically follow the target, and, if desired, follow the sensor (camera), by sampling the telemetry of both the target and the sensor at regularly spaced time intervals, such as once every three seconds, for example. The program thus creates multiple circles 211, and a line joining the circles, and multiple triangles 209, thus showing the paths of travel of each of the target and the sensor. Preferably, the target circles and line are in a bright color such as red, and the triangles in lines between them are in a bright different color such as blue.

Figure 14:
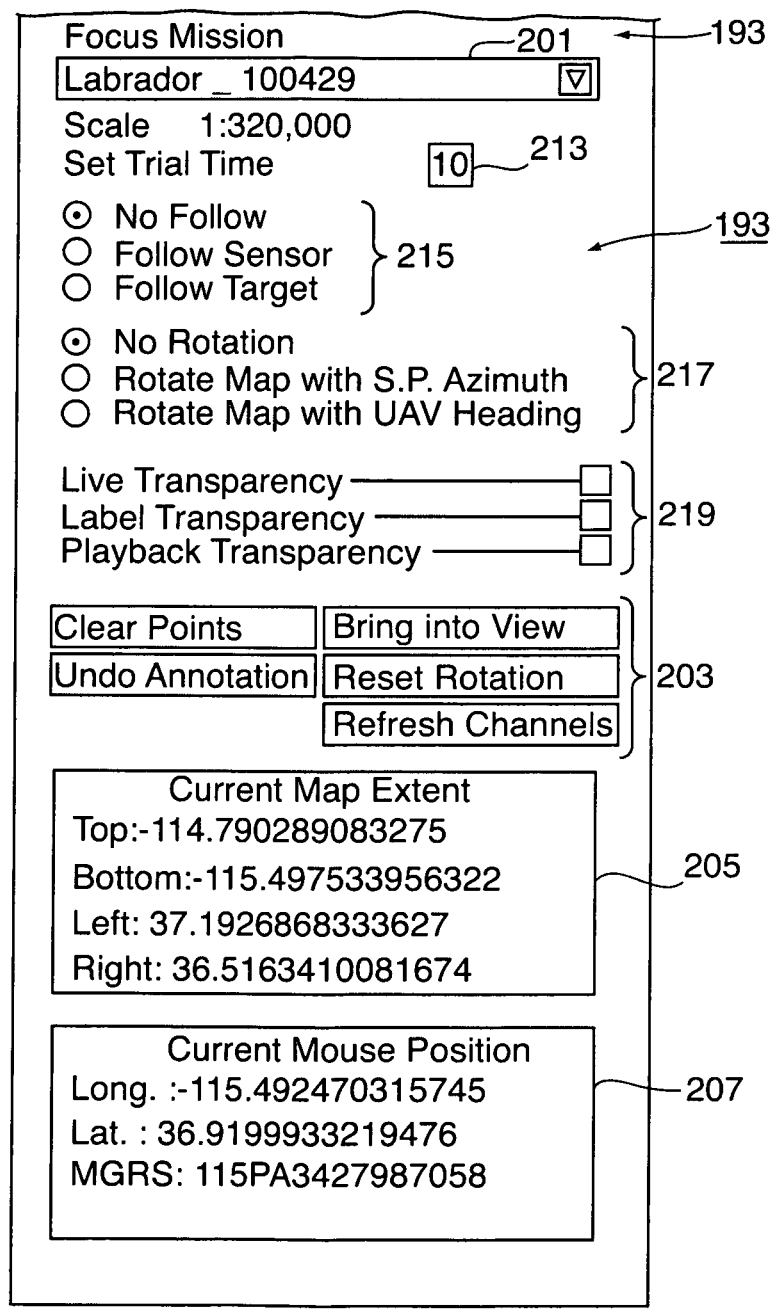
FIG. 14 is an enlarged view of a portion of the display shown in FIG. 13.

FIG. 14 is an enlarged view of the "focus mission" portion, starting at 193, in the control display shown in FIG. 13.

As it is shown in FIG. 13, indicator 199 indicates the selection of satellite view, and indicator 201 shows the channel selected (here, "Labrador").

As it is shown in FIGS. 13 and 14, there are provided various selector buttons 203, and map extent information at 205, with current mouse position information at 207.

Referring now to FIG. 14 alone, the "Focus Mission" display features 193 include an automatic display of the scale of the map.

Referring to FIG. 14, there is a map scale display, followed by a "Set Trail Time" box 213 which gives the selection of the distances for which the trails of the target and sensor are displayed on the map.

There also is a group of "Follow" buttons 215, including a "No Follow" button (which is the default); a "Follow Sensor" button, and a "Follow Target" button. By clicking on these buttons, the map display can be made to display the sequential paths of the target and both the target and the sensor, as described above.

In addition, there is a group 217 of rotation selection buttons. There is a "No Rotation" button (default); a "Rotate Map with S.P. Azimuth" button; and a button to "Rotate Map with UAV Heading." This feature allows the operator to select among the options of either no rotation of the map; or rotating it automatically to keep a steady S.P. Azimuth, or to keep a steady UAV heading. This feature facilitates rapid map comprehension.

Also provided is a set of "Click and drag" type transparency control buttons 219. These buttons control the transparency of the live images; the labels, and the playback, so that certain other features of the map can be made more visible by increasing the transparency of those map features.

A group 203 of specialized control buttons also is provided. A first button is labeled "Clear Points." It is used to clear labels and icons of travel from the map. Another button, labeled "Undo Animation" can be used to erase drawings made by the operator on the display by use of the drawing feature of the invention.

Also, there is a button entitled "Bring into View" which is a zoom control to enlarge features and thereby bring them into view; a "Reset Rotation" to cancel any adjustments in rotation made and thereby return to a "No Rotation" condition; and a "Refresh Channels" button, which will update the list of channels accessible and clear certain mission data that appears under the "satellite view" heading on the display shown in FIG. 14.

Also, in the box 205, the current extent of the map is given, in terms of telemetry coordinates of the top and bottom, and the left and right, sides of the map. This information is preferably updated at frequent time intervals.

The box 207 gives the current mouse position of the computer mouse used to navigate the map. The position is given in terms of longitude and latitude, as well as in military units (MGRS).

Several other controls are provided for controlling zoom on the map. Programming is provided to enable using the scroll ball of the mouse; that is, by moving the scroll ball forward to zoom in and backward to zoom out.

Zooming also can be controlled locating the cursor over a desired point on the map and double clicking.

Further zoom controls can be provided by using a vertical bar and a compass rose, which are conventional displays on maps, and are not shown and will not be described further here.

The map can be moved by locating the cursor over the map and click and hold down the left button on the mouse and dragging the cursor in any direction to move the map in that direction.

The map controls include conventional annotation and drawing function controls. These permit annotations and drawings to be made directly on the map display.

The cursor is placed in the desired location on the map and right-clicked to produce a menu "Add Annotation" is selected from the menu, and dialogue is added in a blank dialogue box that appears on the screen.

An "Undo Annotation" notation appears in the right menu and it can be actuated to erase the last annotation that was made on the map.

Drawing on the map is done as follows:

First, place the cursor on the map and right-click the mouse. This brings up the menu. Select "Draw" input from the menu, place the cursor at the desired starting point on the map and click and hold the left mouse button and drag the mouse to draw. Release the left click button of the mouse to complete the drawing. As with annotations, the drawings can be undone by pushing the "Undo Annotations" button.

Functions also are provided to change GPS formats and to perform other manipulations of GPS and MGRS data.

Advanced filtering and searching can be performed by again right-clicking the mouse to bring up a menu and selecting "Draw Filter Boundaries" from the menu. Left-click the mouse and hold the mouse button down to draw and release the left click to complete a drawing of the boundaries of the area on the map to be searched.

When "Advanced Filter" is selected, filtering can be performed for "products." "Products" are, for example, prior video clips.

Filtering can be done by attributes such as, for example, "Red Truck" or "Running Man," etc.

Dragging the mouse over the specific attribute indicators will generate data associated with the attributes.

Advanced filtering also can be done for chat when selected on the pop-up menu which appears on the screen. This will generate time code and chat data.

Target folders can be selected by selecting the target folders option from the pop-up menu. This will retrieve information from the target folders, which will be described in greater detail below.

The map viewer can be used to conduct at least three different types of search; so called, "product" searches, raw searches, and geo-spatial searches.

Product searches will search only prior products which have been created by use of the logger and stored from past missions.

Raw searches return data recorded from live feeds with every mission, and geo-spatial searches provide results from other ancillary software programs used in conjunction with the map view.

When searching prior products, after entering the search criteria, a list of search results appears. The search results can be selected, and videos from the search results can be reproduced and superimposed on the map. This can be done from archival material by area or by date, or on live video feeds.

Web-based work-stations 26 are equipped to display versions of the maps to provide capabilities similar to those of non-web systems.

Creating Target Folders

Target folder server 63 is provided in accordance with another feature of the invention. Preferably, each target folder is defined by the telemetry of a selected target area. For example, the telemetry defining a town or an area within a town can be defined by its telemetry coordinates. These coordinates are used to identify the target folder.

The logger has a feature which can be selected entitled "Create Target Folder." By clicking on this feature, a menu appears in which the operator can select a name for the target folder and apply it. Thereafter, video clips, marked map images and other relevant information regarding the target area can be dropped into the target file so that others can determine the information that has been gathered concerning the target area, either by use of a "Search Target Folders" search or from a directory created to catalog such folders, or an area search for all target folders within a particular area of interest.

The information which can be stored in a target folder includes identification of aircraft or other vehicles carrying sensor equipment used to investigate the area, personnel involved in the prior surveillance activities, video clips, and other information relevant to the location under investigation.

Although the mapping facility of the equipment described herein can be operated separately and apart from the logger and timeline devices, it is highly advantageous to use the logger, timeline and mapping facility together.

Use of the logger, together with the mapping facility integrates and adds the capability of creating video clips and images, assigning metadata tags to them for searching, etc.

Also, those video clips can be distributed to many different folders or users within the system.

Further, the ability to watch a live feed along with the replay of that feed is a valuable adjunct. Use of the timeline together with the mapping facility has an advantage in that it gives one the ability to see at a glance where a large amount of activity has been logged—that is, to detect "hotspots." In addition, the timeline gives the operator the ability to filter data tags based on key words to identify areas of interest.

Web Viewers

Figure 15:
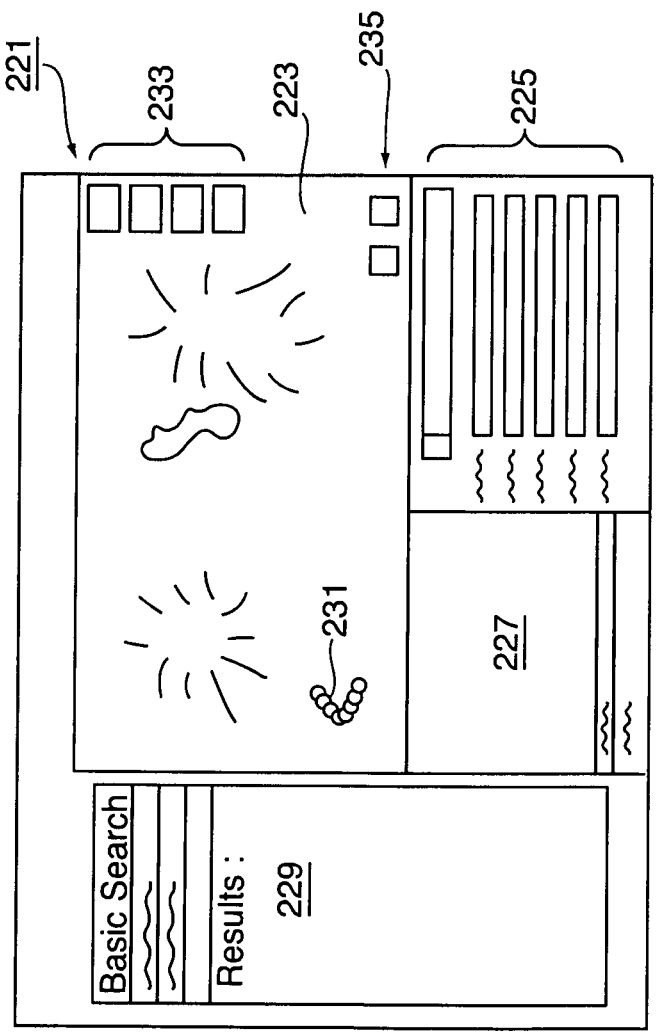
FIG. 15 is a further display screen illustrating another feature of the invention.

FIG. 15 shows a display on one of the web viewers screens 26 (shown in FIG. 9). The display 221 includes a map section 223, a timeline section 225, a live video image viewer 227, and a search section 229, which is used to search for and display the identity of the search results. Thus, the major features of the system are displayed in reduced size on a single screen. The map shows, together with the usual contour features, a series of circles 231 defining the path of a selected target.

Various icons 233 and 235 are provided on the touch screen for the various functions described above with respect to mapping, forming and using timelines, logging, forming, filling and retrieving target folders, and other functions described above.

The terminals 26 preferably use Microsoft "Silverlight" software.

The remote terminals 26 and the screens 221 can be used only with previously recorded and stored video material, and cannot be used to process live video. Nonetheless, they are valuable for analysis and information gathering.

The above description of the invention is intended to be illustrative and not limiting. Various changes or modifications in the embodiments described may occur to those skilled in the art. These can be made without departing from the spirit or scope of the invention.

The invention claimed is:

1. A visual surveillance monitoring system for mapping the locations of a moving surveillance target on the earth's surface, comprising
   a. an input terminal for receiving a video picture sequence of said target with telemetry data indicating the location of the target of the video picture sequence,
   b. a data storage unit for storing map data,
   c. display equipment for displaying said video picture sequence and using map data for displaying maps of areas corresponding to said telemetry data,
   d. a programmed computer for causing to be displayed by said display equipment indicia indicating locations of said moving target on said map and displaying corresponding video images in said sequence and displaying subsequent sequential indicia and corresponding video images at predetermined time intervals along the path of said target on said map during said sequence,
   e. a video logger for receiving and storing video signal streams and having a device for electronic tagging of video images in said streams to locate by timecode video image features of interest according to predetermined criteria,
   f. a timeline display device for receiving video images with electronic tags and displaying for said images a first timeline image representing the total duration of a program and having visible indicia dividing said first timeline into a plurality of segments of a selectable predetermined duration, each comprising multiple standard time divisions, and at least one further timeline representative of a feature of selected ones of said video images and located by said tags, said further timeline being aligned with said first timeline to display only those tagged images occurring within a selected one of said segments, and
   g. a cursor device for alignment with said first timeline to select one of said segments and selectively displaying video images from said further timeline in said selected segment at the location of said cursor.

2. The system of claim 1 in which said telemetry data also indicates the position of a camera which took the video pictures in said sequence, and said programmed computer also selectively displays further indicia indicating the location of said camera at said predetermined time intervals.

3. The system of claim 1 in which each of said indicia is located at a predetermined position on said display, and said map display is shifted as necessary to bring each new indicium to said predetermined position when it appears on said map display.

4. The system of claim 1 including a device for preparing and storing data storage folders, one for each of a plurality of areas on said map, and for storing in each of said folders data representing information gathered concerning said area, and for selectively retrieving said data from each of said folders.

5. The system of claim 1 in which said images from said further timeline are expanded beyond the limits of one of said segments.

6. A video storage and retrieval system comprising
   a. storage equipment for receiving, electronically tagging and storing video streams,
   b. input terminals for receiving both a live video feed showing a selected target, and from said storage equipment, stored video images of said target taken earlier in time,
   c. a video display for displaying both said live video and said stored video images in close proximity to one another simultaneously,
   d. a selector for selecting the stored video images to be displayed on said display, said selector comprising
      1. a timeline display device for receiving video images with electronic tags and displaying for said images a first timeline image representing the total duration of a program and having visible indicia dividing said first timeline into a plurality of segments, each of a selectable pre-determined duration comprising multiple smaller timeline indicia, and at least one further timeline representative of a feature of selected ones of said video images and located by said tags, said further timeline being aligned with said first timeline to display only those tagged images occurring within a selected one of said segments, and 2. a cursor device for alignment with said first timeline to select one of said segments and selectively displaying video images from said further timeline in said selected segment at the location of said cursor, and e. a mapping device for displaying a plurality of map areas on a display and for plotting the movement of a target and a target sensor on each of said map areas.

7. The system of claim 6 including a device for preparing and storing data storage folders, one for each of said plurality of map areas, and for storing in each of said folders data representing information gathered concerning said area, and for selectively retrieving said data from each of said folders.

8. The system of claim 6 including multiple terminals connected to receive through the worldwide web said video display data to allow tagging, timeline usage and mapping usage of said logger, timeline and mapping devices.

9. A method of monitoring visual surveillance of a moving target, comprising
   a. using a video sensor to provide video images of said target over time,
   b. transmitting said images to a receiving station together with telemetry data concerning said target,
   c. displaying on a display a representation of a map for an area around the location of said target,
   d. displaying on said map an icon representing the current location of said target while displaying corresponding video images of said target,
   e. repeating the display of said icon and corresponding video images at spaced time intervals and continuing the display of said icons over time to illustrate a path of movement of said target, and
   f. creating multiple timelines, each for a different attribute of said video signals, and creating electronic tags for said video signals, using a selection timeline representing a video program with indicia marking time segments of said program, each segment being of a selectable variable length and including a plurality of smaller timeline units, and retrieving said information using said timelines and said tags and a cursor positioned to traverse each of said selection timelines and multiple timelines in a selected one of said time segments to enable retrieval and display of video signals recorded during said time segment and having any of said attributes.

10. The method of claim 9 including the step of displaying on said map a series of indicia each representing the position of said sensor at a given time, and continuing the display of said indicia to display on said map the path of movement of said sensor.

11. The method of claim 10 in which said sensor is mounted on a platform selected from the group consisting of an aircraft and a surface vehicle.

12. The method of claim 9 in which images in said timelines for attributes are expanded beyond the limits of the segment within which it is located.

13. The method of claim 9 including the step of applying to said map markings selected from the group consisting of annotations and drawings.

14. The method of claim 9 including the step of creating folders, each for a specific area of said map, and placing items of information about said area into the folder and storing said folders and their contents and making them available for retrieval by operating personnel.

15. The method of claim 9 including displaying a live video picture of a target simultaneously and closely adjacent to a picture recorded previously of the same target.

* * * * *